United States Patent
Rhodes et al.

[11] Patent Number: 6,115,805
[45] Date of Patent: Sep. 5, 2000

[54] NON-ALIGNED DOUBLE WORD FETCH BUFFER

[75] Inventors: Douglas J. Rhodes, Long Valley, N.J.; Mark Ernest Thierbach, South Whitehall Township, Lehigh County, Pa.; Larry R. Tate, South Barrington, Ill.

[73] Assignee: Lucent Technology Inc., Murray Hill, N.J.

[21] Appl. No.: 09/131,440

[22] Filed: Aug. 7, 1998

Related U.S. Application Data

[60] Provisional application No. 60/058,127, Sep. 8, 1997.

[51] Int. Cl.[7] .................................................. G06F 15/00
[52] U.S. Cl. ............................ 712/204; 712/2; 712/5; 712/216; 712/224
[58] Field of Search .................................. 712/1, 4, 2, 5, 712/7, 18, 19, 22, 27, 204, 224, 216

[56] References Cited

U.S. PATENT DOCUMENTS

| | | | |
|---|---|---|---|
| 4,777,594 | 10/1988 | Jones et al. ............................... | 712/240 |
| 5,179,671 | 1/1993 | Kelly et al. .............................. | 712/240 |
| 5,550,972 | 8/1996 | Patrick et al. ........................... | 345/507 |
| 5,696,946 | 12/1997 | Patrick et al. ........................... | 345/513 |

*Primary Examiner*—John A. Follansbee
*Assistant Examiner*—Dzung C. Nguyen
*Attorney, Agent, or Firm*—Darby & Darby

[57] ABSTRACT

A non-aligned double word fetch buffer is integrated into a digital signal processor to handle non-aligned double word (32 bit) fetches. When a misaligned double word fetch is detected, the buffer causes a two cycle non-interruptable instruction to be initiated. The first cycle is a 16-bit misaligned data fetch. The address pointer is incremented by 2 and stored in a temporary pointer register. The second cycle is a 32-bit double word fetch based on the temporary pointer with its least significant bit set to 0 (an aligned fetch). The low word from this fetch is used to satisfy the current misaligned double word fetch and the high word is stored in a temporary buffer register in case it proves useful in subsequent misaligned double fetch instructions. Finally, the temporary address pointer is incremented by 2 for possible use in subsequent misaligned fetches. If a subsequent misaligned fetch using the same address pointer is detected, a one-cycle misaligned double word fetch may be simulated by using the buffered memory fetch data combined with another aligned double word fetch and an appropriate pointer update. A double word per cycle data rate may thereby be maintained during an entire sequence of misaligned data fetches, except when processing the first state of the loop, during which time the buffer is set up.

18 Claims, 3 Drawing Sheets

NON-ALIGNED DOUBLE WORD FETCH BUFFER

CROSS REFERENCE TO RELATED APPLICATIONS

This application claims priority under 35 U.S.C. § 119 from U.S. Provisional Application Ser. No. 60/058,127 entitled "Non-Aligned Double Word Fetch Buffer," filed on Sep. 8, 1997, the contents of which is hereby incorporated by reference.

FIELD OF THE INVENTION

This invention relates to a non-aligned double word fetch buffer for use with a double word aligned computer memory system. BACKGROUND OF THE INVENTION A digital signal processor (DSP) is a special-purpose CPU utilized for digital processing and analysis of signals from analog sources, such as sound. The analog signals are converted into digital data and analyzed using various algorithms, such as Fast Fourier Transforms. DSPs are designed for particularly fast performance of certain operations, such as multiplication, multiplying and accumulating, and shifting and accumulating, because the math-intensive processing applications for DSPs rely heavily on such operations. For this reason, a DSP will typically include special hardware circuits to perform multiplication, accumulation and shifting operations.

One popular form of DSP architecture is known as a Multiply-Accumulate or MAC processor. The MAC processor implements an architecture that takes advantage of the fact that the most common data processing operations involve multiplying two values, adding the resulting value to another value, and then accumulating the result. These basic operations are efficiently carried out utilizing specially configured high-speed multipliers and accumulators, hence the "Multiply-Accumulate" nomenclature. In order to increase the processing power of MAC processors, they have been designed to perform different processes concurrently. Towards this end, DSP architectures with plural MAC structures have been developed. For example, a dual MAC processor is capable of performing two independent MAC operations concurrently.

Double word aligned memory architecture is useful in a variety of situations, and particularly in digital signal processing hardware. For example, a digital signal processing chip typically has one or more Multiply-Accumulators (MACs) for processing FIR and IIR filters. Each MAC has a multiplier M which stores its output in a product register P. The product register is connected to an input of an adder A whose output is stored in one of several accumulator registers. A second input of the adder is connected to the accumulator array to allow for a continuous series of cumulative additions. A dual MAC digital signal processor provides two MACs configured to operate in parallel. A newly-developed configuration for this dual-MAC arrangement is shown in FIG. 1.

When using a dual-MAC system, it is efficient to provide a memory architecture that allows two sequential, i.e., adjacent data values to be accessed in a single fetch so that they can be processed in parallel by the dual-MAC processor. For 16-bit data values, an efficient memory architecture is double word aligned memory which allows two 16-bit data words to be fetched with a one-cycle 32-bit fetch command. A drawback to this architecture, however, is that only double word fetches starting with an even address can be completed in a single 32-bit fetch cycle. When two sequential words are to be fetched starting from an odd memory address, they can only be accessed with by two separate fetches from memory (i.e., two 16-bit single word fetches). Thus, a double word fetch from an odd address takes two cycles. This can cause a significant impact on the data throughput when performing applications such as digital signal processing.

Digital signal processing algorithms typically use one or more iterative loops to process sampled data stored in memory. For example, sampled 16-bit data may be stored as consecutive 16-bit values in an array X starting at address 0. During FIR filtering, samples X(0) through X(n) are processed in a loop to generate output Y(n). Using the dual-MAC architecture of FIG. 1 with its three-input adder path, two taps (i.e., multiply-accumulate steps) of the FIR filter may be processed per cycle during the generation of Y(n). The first double-word fetch will return sequential data X(0) and X(1) to be processed by the MACs. Sample data X(0) is processed by the first MAC and X(1) is processed by the second MAC. The next cycle processes data X(2) and X(3), and so on. The loop continues until all n samples have been processed.

The second iteration requires incrementing the starting address by 1 to generate Y(n+1) from data samples X(1) through X(n+1). In incrementing the starting address by one 16-bit word in this manner, it can easily be seen that the address pointer will be misaligned (e.g., pointing to an odd memory address) every other pass through the filter. Because algorithms as basic to DSP as FIR filters force misalignment on alternate passes through their inner loops when performing sample based signal processing, it is necessary to provide a mechanism to reduce the effect of misaligned data fetches on data throughput. Although this problem can be avoided by appropriate programming techniques, software solutions result in reduced code density, wasted MIPS, and unduly complicated code development.

In accordance with the present invention, a non-aligned double word fetch buffer is integrated within the Data Memory Addressing Unit of the memory system. The buffer receives input signals indicating when pointer-based memory fetches and/or stores are to be executed, as well as information regarding the pointer to be used and its value. When a misaligned double word fetch is detected, the buffer causes a two cycle non-interruptable instruction to be initiated. The first cycle is a single word misaligned data fetch. The address pointer is incremented by 2 and stored in a temporary pointer register. The second cycle is a 32-bit double word fetch based on the temporary pointer with its least significant bit set to 0 (an aligned fetch). The first word from this fetch is used to satisfy the current misaligned double word fetch and the second, extra word is stored in a temporary buffer register in case it proves useful in subsequent misaligned double fetch instructions. Finally, the temporary address pointer is incremented by 2 for possible use in subsequent misaligned fetches.

If a subsequent misaligned fetch using the same address pointer is detected, a one-cycle misaligned double word fetch may be simulated by using the buffered memory fetch data combined with another aligned double word fetch and an appropriate pointer update. Thus, a double word per cycle data rate may be maintained during an entire sequence of misaligned data fetches, except when processing the first state of the loop, during which time the buffer is set up. A non-aligned double word fetch buffer according to the present invention can be implemented with a minimum of additional hardware and operates transparently to the programmer.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENT

Figure 1:
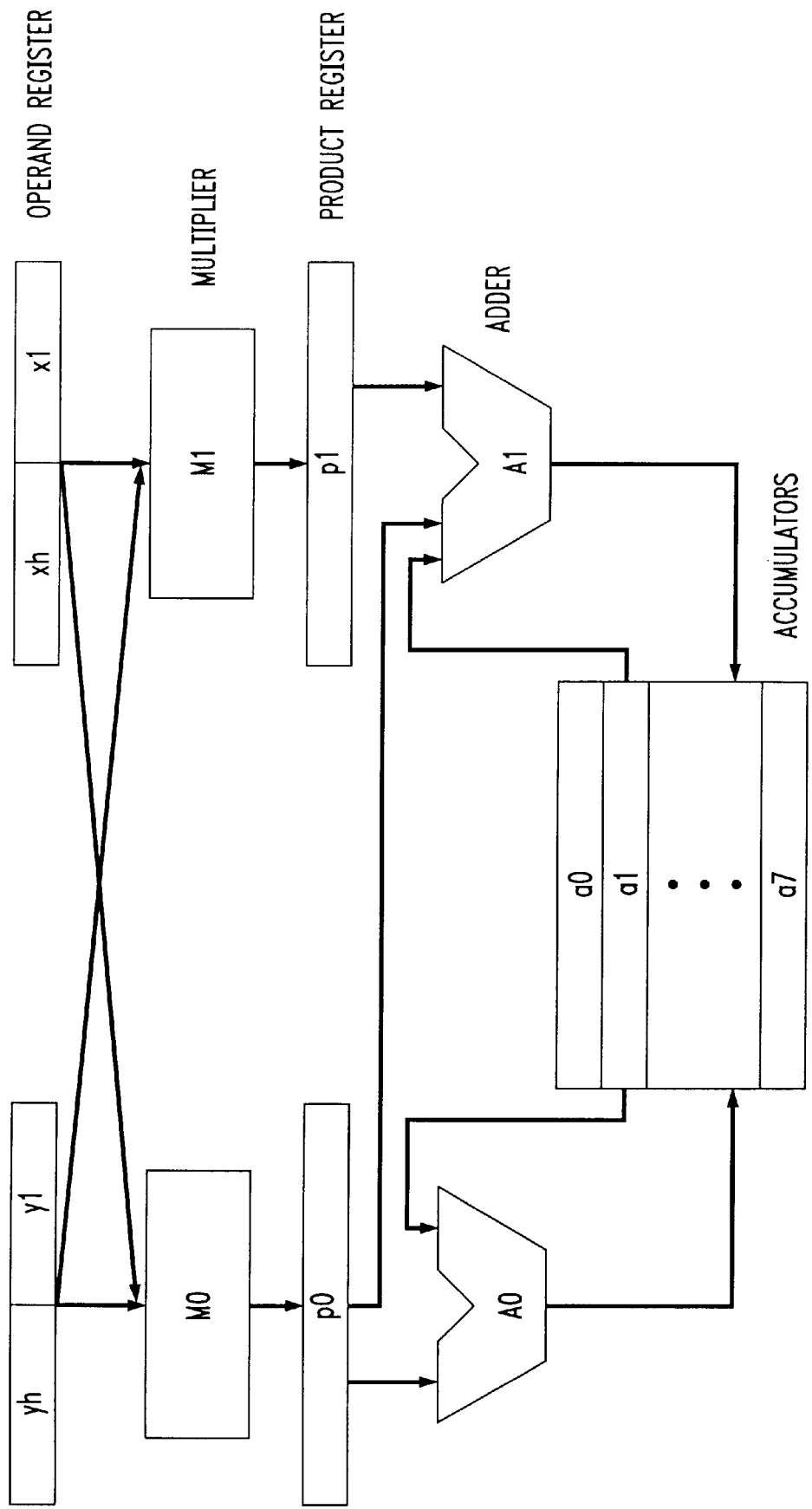
FIG. 1 is a simplified block diagram of a dual-MAC processor data arithmetic unit.

Referring now to FIG. 1, there is illustrated a simplified block diagram for a data arithmetic unit ("DAU") in a dual-MAC processor of the type in which the invention is preferably realized.

The DAU includes dual 32-bit registers x and y that are operated as four 16-bit registers $y_h$, $y_L$, $x_h$ and $x_L$ when used to provide the inputs to two signed 16-bit X 16-bit multipliers M0 and M1. The respective multipliers produce respective 32-bit results which are stored into respective product registers p0 and p1. As used herein, the bits in a 32-bit buffer are numbered 31 to 0 from left to right, with bit 31 being the highest order bit. When two 16-bit words are stored in a 32 bit register, bits 31:16 correspond to the high-order word (h) and bits 15:0 correspond to the low-order word (L).

The data stored in the respective product registers p0 and p1, together with adder units A0, A1, perform general addition and subtraction operations. Concurrent multiply and accumulation operations may be achieved by using the two multipliers and the two adders.

The results from the adders are then fed to a register array comprising eight accumulators a0 through a7, the outputs of which may be added back as further inputs to the adders.

Digital signal processing algorithms typically use one or more iterative loops to process sampled data. For example, an array X of sampled 16-bit data may be stored in sequential memory addresses as consecutive 16-bit values starting at address 0. During FIR filtering, samples X(0) through X(n) are processed in a loop to generate output Y(n). The loop begins by loading the address pointer rN with the starting address of the samples to be processed. In this case, rN=0. When a dual-MAC architecture, such as shown in FIG. 1, is used, two data values may be processed at a time. Thus, $y_h$ and $y_L$ are both loaded by a single pointer load command of the y data register. Typically, this is accomplished by an indirect pointer load with a double post-increment, i.e., yd=*rN++. The result of this command, designated generically as a F1X++ command, is that $y_h$ is loaded with data X(0), $y_L$ is loaded with data X(1), and the address pointer rN is post-incremented by 2, i.e., rN=rN+2. Since the value of rN is even, the command may be executed as a single cycle double word fetch. The next cycle processes sequentially stored data X(2) and X(3). The loop continues until all n samples have been processed.

The second iteration requires incrementing the starting address by 1 to generate Y(n+1) from data samples X(1) through X(n+1). In the above example, rN=1. Because the starting address is incremented by one 16-bit word, the address pointer rN will be misaligned and therefor the y register cannot be loaded with a one-cycle double word fetch operation.

Figure 2:
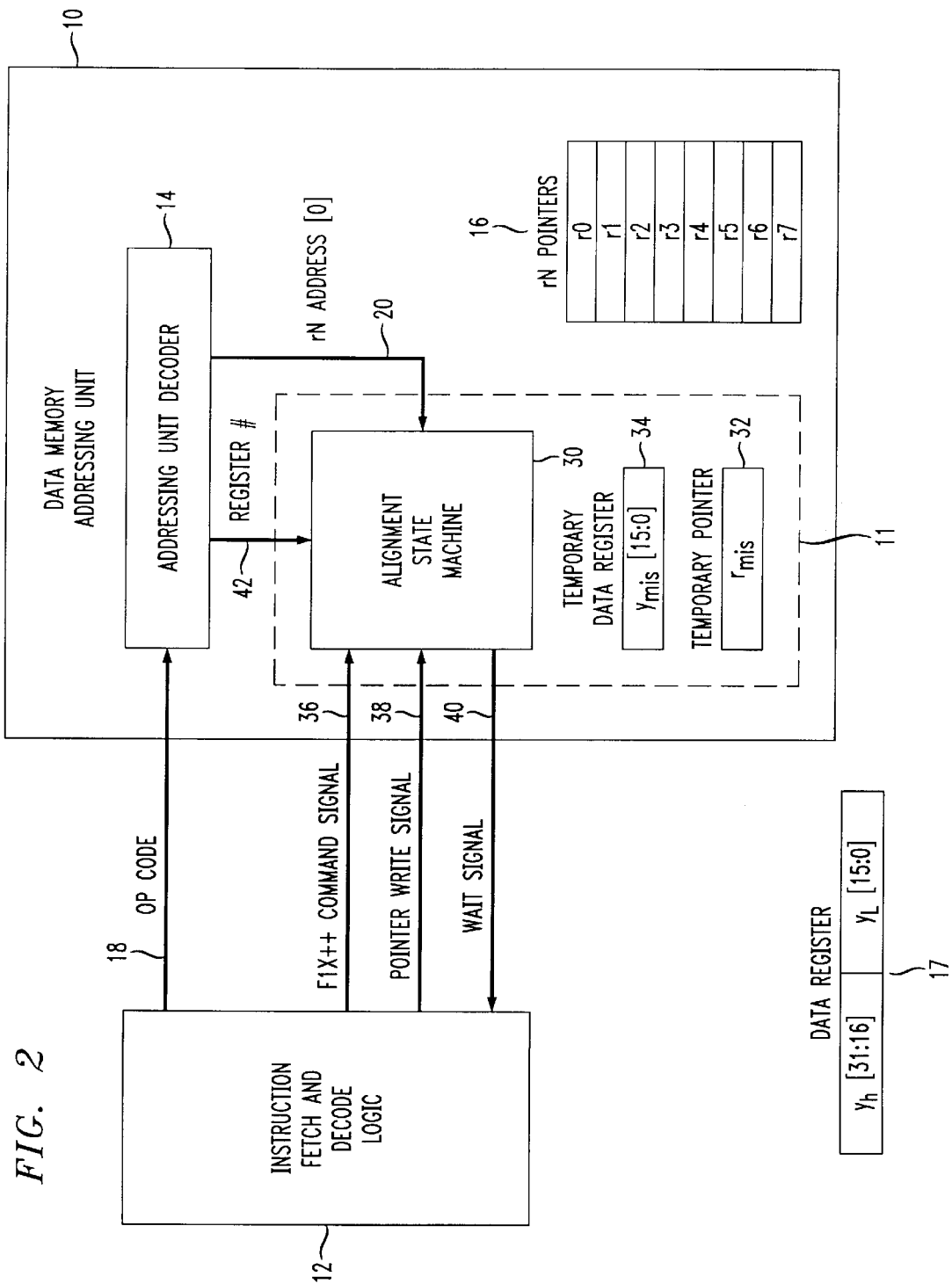
FIG. 2 is a simplified block diagram of a Data Memory Addressing Unit connected to instruction fetch and decode logic and incorporating a non-aligned double word fetch buffer according to the present invention.

FIG. 2 is a simplified block diagram of a Data Memory Addressing Unit (DMAU) 10 for a double word aligned memory system. The DMAU 10 is connected to an Instruction Fetch and Decode unit (IFD) 12 which may be formed of standard components and is part of the command processor. The DMAU 10 comprises an Addressing Unit Decoder 14 and one or more 20-bit address pointers 16 designated generically as rN. In the preferred embodiment, there are 8 such rN pointers, designated r0 through r7. Also shown is a 32-bit y data register 17 which, in the present embodiment, is used to store two 16-bit data values for subsequent processing. The high-order bits, 31:16, represent $y_h$ and $y_L$ the low-order bits, 15:0, represent $y_L$. In the preferred embodiment, $y_h$ and $y_L$ of the y register 17 are y input registers for the dual-MAC processor of FIG. 1.

According to the invention, the DMAU 10 further includes a non-aligned double word fetch buffer 11. The buffer 11 consists of an alignment state machine 30, a temporary pointer 32, and a temporary data register 34. The operation of buffer 11 will be discussed in more detail below.

In operation, as memory instructions are processed by the IFD 12, the command op codes are presented via command bus 18 to the Addressing Unit Decoder 14 where they are subsequently executed. In a double word aligned memory system, double word fetches starting with an even pointer address can be completed in a single cycle 32-bit fetch. However, double word fetches starting with an odd pointer address require two separate memory fetches, and thus take two fetch cycles. When a sequence of non-aligned double word fetches must be executed, the data throughput can suffer significantly. The present invention, by way of buffer 11, allows a double word per cycle data rate to be maintained during an entire sequence of misaligned data fetches, except when processing the first state of the loop, during which time the buffer is set up.

In the preferred embodiment, the non-aligned double word fetch buffer 11 is used to provide increased data throughput in digital signal processing hardware. Accordingly, the operation of the non-aligned double word fetch buffer is discussed below with reference to a digital signal processing algorithm. However, a buffer 11 according to the present invention may be used in many other applications as well.

The buffer 11 according to the present invention is controlled by an alignment state machine 30 within the DMAU 10 and makes use of a temporary buffer pointer $r_{mis}$ 32 and a temporary buffer data register $y_{mis}$ 34. The state machine 30 receives two input signals from the IFD 12. The first is the F1X++ command signal 36 which indicates when the op code presented to the Addressing Unit Decoder 14 over command bus 18 includes a pointer-based data load command, such as yd=*rN++. The second signal is a pointer write signal on bus 18 which indicates when the op code on command bus 18 is a pointer write operation. The state machine 30 also outputs a wait signal 40 to the IFD 12 which is used to signal that the next cycle is a wait state.

The pointer address bus 20 contains the address location stored in the pointer rN currently in use by the addressing unit decoder 14. The state machine monitors the least significant bit on the pointer address bus 20. A misaligned data address is indicated when the least significant address bit is 1. The state machine 30 also receives a register number signal 42 from the Addressing Unit Decoder 14 which indicates the register number N encoded in a rN register based command. For example, if a command to load the r3 register were presented over command bus 18, signal 42 would be 3 and signal 20 would be the least significant bit of the address stored in register r3.

Figure 3:
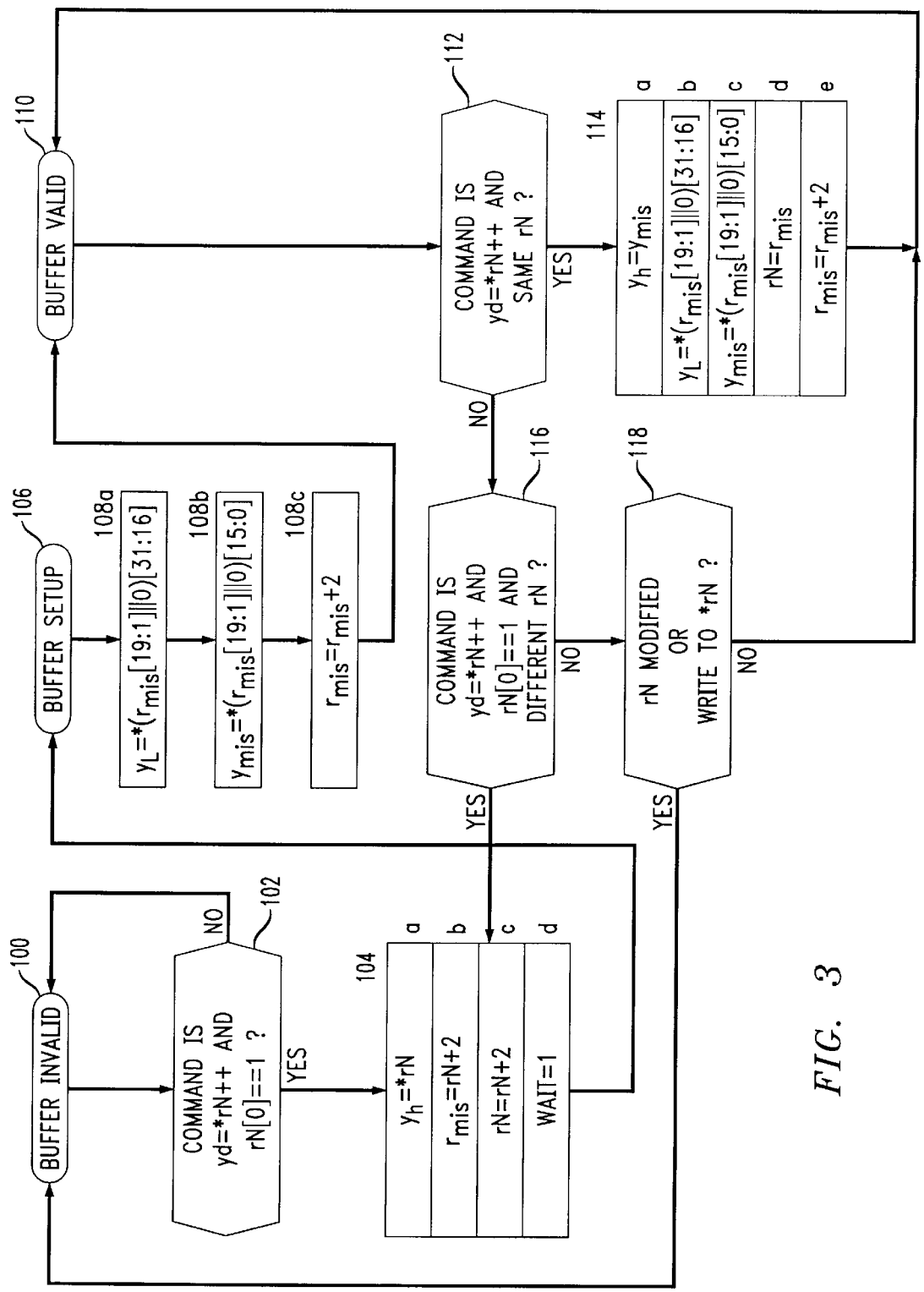
FIG. 3 is a flow chart describing the operation of the alignment state machine which controls the buffer.

The operation of the buffer's state machine 30 is illustrated in the flow chart of FIG. 3. It should be noted that the illustrated embodiment is discussed with respect to only the y register. However, a similar arrangement may be used to buffer several data loads for several registers with additional hardware as apparent to one skilled in the art.

The state machine 30 begins in the Buffer Invalid State (Block 100). This is the default state and it indicates that the buffer 11 is not loaded with currently valid data. The command signal 36 and pointer address bus 20 are monitored until a double word fetch command, i.e., yd=*rN++, is detected and the least significant rN register bit, rN[0], equals 1, indicating that the address is misaligned (Block 102). When a misaligned state is detected, a two-cycle non-interruptable memory command sequence is initiated by the state machine (Blocks 104a–104d and 108a–108c).

In the first cycle, a single 16-bit misaligned data fetch is initiated to load $y_h$ with the data stored in the address pointed to by register rN, i.e., $y_h$=*rN, (Block 104a). The temporary pointer register $r_{mis}$ and address pointer register rN are loaded with a pointer value equal to the value stored in rN+2 (Blocks 104b, 104c). (For the present example, a 20-bit address is stored in $r_{mis}$). Finally, the wait signal 40 is set to 1 to indicate that the IFD 12 should enter a one-cycle wait state. (Block 104d). The state machine 30 then proceeds to the Buffer Setup State (Block 106). It should be noted that while blocks 104a–104d are discussed in a linear fashion, preferably, each function is performed in parallel during the first cycle).

In the second cycle, an aligned double word fetch is initiated based on the 20-bit even pointer address $r_{mis}$-1. This data address value may be is achieved by using the 19 high order bits of $r_{mis}$ (bits 19:1) and forcing the least significant bit to 0, i.e, y=*$r_{mis}$[19:1]||"0" where "||" indicates a concatanate function. The fetched 32-bits of data are split. The high order bits, 31:16, are stored in register $y_L$ (block 108a), and the lower order bits, 0:15, are stored in the temporary buffer $y_{mis}$ (block 108b). Finally, the value stored in $r_{mis}$, is post-incremented by 2 for possible use in subsequent misaligned fetches (Block 108c). The functions in blocks 108a–108c are preferably performed in parallel during a single cycle. At this point, the y-register has been loaded with valid data and the state machine enters the Buffer Valid State (Block 110).

In the Buffer Valid state (Block 110), the state machine 30 monitors command signal 36 and register number signal 32 and reacts to the occurrence of specified "trigger" conditions, shown in blocks 112, 116, and 118. In the preferred embodiment, the logic tests of steps 112, 116, and 118 are separate "triggers" which operate in parallel. However, for clarity, these triggers have been illustrated in a sequential format in FIG. 3.

According to the invention, subsequent misaligned fetches using the same rN pointer can use the buffered memory fetch, stored in $y_{mis}$, combined with another aligned double word fetch to simulate a one double word per instruction cycle fetch rate. If a double word fetch command yd=*rN ++ is detected using the same register N as the previous misaligned fetch (Block 112), the buffered memory fetch is utilized (Blocks 114a–114e). Register $y_h$ is loaded with the buffered data $y_{mis}$ (block 114a). An aligned double word fetch is initiated based on the even pointer address $r_{mis}$-1 as described above. The high order bits from the fetched data, bits 31:16, are stored in register $y_L$ and the lower order bits, 0:15, are stored in the temporary buffer $y_{mis}$. (Blocks 114b, 114c). The pointer register rN is loaded with the value of $r_{mis}$ (block 114d) and $r_{mis}$ is post-incremented by 2 (block 114e). Functions 114a–114e are preferably performed in parallel in a single cycle. The buffered misaligned data word thus allows a misaligned double word fetch to be achieved with a single cycle aligned double word fetch.

In the preferred embodiment, the misaligned double word fetch buffer is only valid under certain conditions. The buffer is only valid for a single register rN, where N is the specific pointer being buffered. If a misaligned double word fetches based on a different rN pointer is detected (Block 116), a new two cycle non-interruptable buffer setup sequence will be initiated, starting from steps 104a–104d. However, additional logic and temporary registers can easily be added to implement the buffer for several rN registers, as will be apparent to one skilled in the art.

Also, the buffer is preferably invalidated if any rN pointer write occurs. (Block 118). This restriction is sufficient to insure that no alignment function state controller state need be saved during interrupts. This restriction could be eliminated by including additional hardware as apparent to those skilled in the art. However, provided several rN registers are available, this is not a significant limitation because the executing program can be coded to avoid rN pointer writes within the loop.

Finally, the preferred embodiment of the buffer only supports rN post-increments of 2, as the buffer's primary use is in conjunction with loading the double-word y register. Therefore, only sequences of double-word fetches will be buffered by this arrangement. The buffer may be easily adapted to allow for post increments of −2 with a modest amount of additional hardware.

While the invention has been particularly shown and described with reference to preferred embodiments thereof, it will be understood by those skilled in the art that various changes in form and details may be made therein without departing from the spirit and scope of the invention. In particular, the double word non-aligned fetch buffer may be implemented as part of a double word aligned memory system to be used in any number of situations, and not only a digital signal processing environment. Further, while the memory architecture of preferred embodiment has a 16-bit data word, the present invention is not limited to only 16-bit words but is equally applicable to memory systems with data values of any size.

We claim:

1. A method for buffering data to increase the execution speed of a plurality of non-aligned double word fetches of sequential n-bit data words from a memory system supporting single word and aligned double word data fetches, said method comprising the steps of:

upon an occurrence of a first misaligned double word fetch request, reading a first data word from a designated starting location in the memory system;

advancing to a next word location in memory and performing an aligned double word fetch from memory of said next word and the immediately following word;

concatenating said next word to said first data word and providing a concatenated word in response to the misaligned double word fetch request;

defining said next word as a previous next following word; and if a misaligned double word fetch request follows:

(a) advancing two word positions in memory to a new word position;

(b) performing an aligned double word fetch from said new word position and the next following word;

(c) concatenating said new word to the previous next following word and providing the concatenated word in response to a most recent misaligned double word fetch request; and (d) defining a next following word as the previous next following word and returning to step (a).

2. In a computer having a command processor and memory system supporting single word and aligned double word data fetches of n-bit data words, a non-aligned double word fetch buffer comprising:

means responsive to a occurrence of a first misaligned double word fetch request for reading a first data word from a designated starting location in memory;

means for performing an aligned double word fetch from a next word location in memory and an immediately following word;

means responsive to the misaligned double word fetch request for concatenating said next word to said first data word and providing the concatenated word;

means for storing said next word location;

means responsive to the occurrence of a subsequent misaligned double word fetch request for advancing two word positions in memory to a new word position;

means for performing an aligned double word fetch from said new word position and a next following word;

means responsive to a most recent misaligned double word fetch request for concatenating said new word position to the stored word and providing the concatenated word;

the previous next following word being stored in said means for storing.

3. A method of buffering data in a data buffer to thereby increase the execution speed of a plurality of non-aligned double word pointer-based fetches of sequential n-bit data words from a memory system supporting single word and aligned double word data fetches, said method comprising the steps of:

in response to a occurrence of a first misaligned double word pointer-based fetch operation to return first and second sequential data words from a starting memory address provided by a first address pointer, fetching said first and second sequential data words and a third sequential data word from memory;

loading said first and second sequential data words into a data register to satisfy said first misaligned double word fetch operation;

storing said third data word in said data buffer;

indicating said buffer is valid once said third data word is stored in said data buffer;

when said data buffer is valid, and in response to the occurrence of a subsequent misaligned double word pointer-based fetch operation to return said third data word and a fourth sequential data word from said memory address provided by said first address pointer:

a) executing an aligned double word fetch operation to fetch said fourth sequential data word and a fifth sequential data word;

b) loading said data register with said third data word and said fourth sequential data word to satisfy said subsequent misaligned double word fetch operation; and c) storing said fifth data word in said data buffer.

4. The method of claim 3, wherein said step of fetching said first, second, and third sequential data words comprises the steps of:

issuing a single word data fetch from said starting address to thereby fetch said first sequential data word;

incrementing the starting address stored in said first address pointer by two;

issuing an aligned double word data fetch from the address preceding the incremented address to thereby fetch said second and third sequential data words;

loading a temporary address pointer register with said incremented address; and incrementing the address stored in said temporary address pointer register by two.

5. The method of claim 4, wherein said step of executing an aligned double word fetch operation to fetch said fourth and fifth sequential data words further comprises the steps of:

loading the address value stored in said temporary address pointer register into said first address pointer register; and incrementing the address value stored in said temporary address pointer register by two.

6. The method of claim 3, further comprising the step of indicating said buffer is invalid in response to a detection of an external modification of said address pointer.

7. The method of claim 3, further comprising the step of indicating said data buffer is invalid in response to the detection of a misaligned double word pointer-based fetch operation based on a second address pointer.

8. A method of buffering data to increase the execution speed of a plurality of non-aligned double word pointer-based fetches of sequential n-bit data words from a memory system supporting single word and aligned double word pointer-based data fetches, said method comprising the steps of:

in response to a occurrence of a first misaligned double word fetch operation to return first and second sequential data words stored from a starting memory address stored in an address pointer register, initializing said data buffer by:

a) issuing a single word fetch from said starting memory address to thereby fetch said first sequential data word, b) incrementing the address stored in said address pointer register by two and loading a temporary address pointer register with said incremented address, c) issuing an aligned double word fetch from an address preceding the address stored in said temporary address pointer register to thereby fetch said second sequential data word and a third sequential data word, d) storing said third data word in a buffer register, and e) incrementing the address in said temporary address pointer register by two;

returning said first and second sequential data words to complete said first misaligned double word fetch;

in response to the occurrence of a subsequent misaligned double word fetch operation of said third sequential data word and a sequential fourth data word from the starting address stored in said address pointer register, using said buffer by:

f) issuing an aligned double word data fetch from the address preceding the address stored in said temporary address pointer register to thereby fetch said fourth sequential data word and a fifth sequential data word;

g) storing in said address pointer register the address value in said temporary address pointer register;

h) incrementing a value of said temporary address pointer register by two; and i) returning said third and fourth sequential data words to satisfy said subsequent misaligned double word fetch.

9. In a computer having a command processor and memory system supporting single word and aligned double word data pointer-based fetches of n-bit data words, a non-aligned double word fetch buffer comprising:

a buffer register;

means responsive to the occurrence of a first misaligned double word pointer-based fetch of first and second sequential data words from a starting memory address stored in an address pointer for fetching said first and second sequential data words and a third sequential data word from said memory system;

means for returning said fetched first and second sequential data words to satisfy said first misaligned double word fetch means for storing said fetched third data word in said data buffer;

means for indicating said data buffer is valid;

means responsive to the occurrence, when said buffer is valid, of a subsequent misaligned double word pointer-based fetch of said third sequential data word and a fourth sequential data word from said starting memory address stored in said address pointer for executing an aligned double word fetch operation to fetch said fourth data word and a fifth data word;

means for returning said stored said third data word and said fetched fourth data word to satisfy said subsequent misaligned double word fetch; and means for storing said fetched fifth sequential data word in said data buffer.

10. The buffer of claim 9, wherein said means for fetching said first, second, and third sequential data words from memory comprises:

means for issuing a single word data fetch of data at said memory starting address to thereby fetch said first data word;

means to increment the address stored in said first address pointer by two;

means to load a temporary address pointer register with said incremented address;

means for issuing an aligned double word data fetch of data stored at a memory address preceding the incremented address pointer to thereby fetch said second and third data words; and means responsive to fetching said second and third sequential data words for incrementing a address stored in said temporary address pointer register by two.

11. The buffer of claim 10, wherein said means for executing an aligned double word fetch operation to fetch said fourth and fifth sequential data words, further comprises:

means responsive to fetching said fourth and fifth sequential data words for loading said first address pointer register with the address value stored in said temporary address pointer register; and means responsive to fetching said fourth and fifth sequential data words for incrementing the value stored in said temporary address pointer register by two.

12. The buffer of claim 9, further comprising means responsive to a detection of an external modification of said data address pointer for indicating said buffer is invalid.

13. The buffer of claim 9, further comprising means responsive to the detection of a misaligned double word pointer-based fetch operation based on a second address pointer for indicating said data buffer is invalid.

14. A digital signal processor connectable to a memory system supporting single word and aligned double word data pointer-based fetches of n-bit data words, said processor including instruction fetch and decode logic connected to a data memory addressing unit and signaling a occurrance of a double-word pointer based fetch command, said data memory addressing unit processing data fetch commands and including a non-aligned double word fetch buffer, said fetch buffer comprising:

a buffer register;

means responsive to the occurrence of a first misaligned double word pointer-based fetch of first and second sequential data words from a starting memory address stored in an address pointer for fetching said first and second sequential data words and a third sequential data word from the memory system;

means for returning said fetched first and second data words to satisfy said first misaligned double word fetch means for storing said fetched third sequential data word in said data buffer;

means for indicating said buffer is valid;

means responsive to the occurrence, when said buffer is valid, of a subsequent misaligned double word pointer-based fetch of said third sequential data word and a fourth sequential data word from said starting memory address stored in said address pointer for executing an aligned double word fetch operation to fetch said fourth sequential data word and a fifth data word;

means for returning said stored said third sequential data word and said fetched fourth data word to satisfy said subsequent misaligned double word fetch; and means for storing said fetched fifth sequential data word in said data buffer.

15. The buffer of claim 14, wherein said means for fetching said first, second, and third sequential data words from memory comprises:

means for issuing a single word data fetch of data at said starting address to thereby fetch said first sequential data word;

means to increment the address stored in said first address pointer by two;

means to load a temporary address pointer register with said incremented address;

means for issuing an aligned double word data fetch of data stored at the memory address preceding the incremented address pointer to thereby fetch said second and third sequential data words; and means responsive to fetching said second and third sequential data words for incrementing the address stored in said temporary address pointer register by two.

16. The buffer of claim 15, wherein said means for executing an aligned double word fetch operation to fetch said fourth and fifth sequential data words, further comprises:

means responsive to fetching said fourth and fifth sequential data words for loading said first address pointer register with the address value stored in said temporary address pointer register; and means responsive to fetching said fourth and fifth data words for incrementing a value stored in said temporary address pointer register by two.

17. The buffer of claim 14, further comprising means responsive to a detection of an external modification of said data address pointer for indicating said buffer is invalid.

18. The buffer of claim 14, further comprising means responsive to a detection of a misaligned double word pointer-based fetch operation based on a second address pointer for indicating said data buffer is invalid.

* * * * *

UNITED STATES PATENT AND TRADEMARK OFFICE
CERTIFICATE OF CORRECTION

PATENT NO.  : 6,115,805

DATED       : September 5, 2000

INVENTOR(S) : Douglas J. Rhodes et al.

It is certified that error appears in the above-identified patent and that said Letters Patent is hereby corrected as shown below:

ON THE TITLE PAGE
Item [73]
Assignee should be "Lucent Technologies Inc."

Signed and Sealed this

Eighth Day of May, 2001

Attest:

NICHOLAS P. GODICI

Attesting Officer     Acting Director of the United States Patent and Trademark Office